(12) United States Patent
Vacassy et al.

(10) Patent No.: US 9,463,551 B2
(45) Date of Patent: Oct. 11, 2016

(54) POLISHING PAD WITH POROUS INTERFACE AND SOLID CORE, AND RELATED APPARATUS AND METHODS

(71) Applicant: Cabot Microelectronics Corporation, Aurora, IL (US)

(72) Inventors: Robert Vacassy, Aurora, IL (US); George Fotou, Aurora, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 1 day.

(21) Appl. No.: 14/459,452

(22) Filed: Aug. 14, 2014

(65) Prior Publication Data

US 2015/0056892 A1 Feb. 26, 2015

Related U.S. Application Data

(60) Provisional application No. 61/868,915, filed on Aug. 22, 2013.

(51) Int. Cl.
| | | |
|---|---|---|
| *B24B 37/24* | (2012.01) | |
| *B24B 37/22* | (2012.01) | |
| *B24B 37/04* | (2012.01) | |
| *C08J 9/00* | (2006.01) | |
| *H01L 21/306* | (2006.01) | |
| *C08J 9/12* | (2006.01) | |

(52) U.S. Cl.
CPC ............. *B24B 37/24* (2013.01); *B24B 37/042* (2013.01); *B24B 37/22* (2013.01); *C08J 9/122* (2013.01); *C08J 2201/032* (2013.01); *C08J 2203/06* (2013.01); *C08J 2205/044* (2013.01); *C08J 2205/052* (2013.01); *C08J 2207/00* (2013.01); *C08J 2300/22* (2013.01); *C08J 2300/26* (2013.01); *C08J 2375/04* (2013.01)

(58) Field of Classification Search
CPC ........ C08J 9/00; C08J 9/122; C08J 2375/04; C08J 2201/032; C08J 2207/00; C08J 2205/052; C08J 2300/22; C08J 2300/26; H01L 21/30625; B24B 37/24; B24B 37/22; B24B 37/042

See application file for complete search history.

(56) References Cited

U.S. PATENT DOCUMENTS

| | | | |
|---|---|---|---|
| 6,530,829 B1 | 3/2003 | Kramer | |
| 6,863,599 B2 | 3/2005 | Kramer | |
| 6,887,336 B2 | 5/2005 | Kramer | |
| 6,913,517 B2 * | 7/2005 | Prasad | .................... B24B 37/24 451/41 |

(Continued)

FOREIGN PATENT DOCUMENTS

| | | |
|---|---|---|
| JP | 201105299 A | 4/2001 |
| JP | 2011073085 A | 4/2011 |

OTHER PUBLICATIONS

Korean Intellectual Property Office AS ISA, International Search Report issued in connection with Application No. PCT/US2014/050997 on Nov. 27, 2014.

(Continued)

*Primary Examiner* — Dung Van Nguyen
(74) *Attorney, Agent, or Firm* — Thomas Omholt; Arlene Hornilla; Salim A. Hasan

(57) ABSTRACT

Disclosed is a polishing pad for chemical-mechanical polishing. The polishing pad has a porous interface and a substantially non-porous bulk core. Also disclosed are related apparatus and methods for using and preparing the polishing pad.

11 Claims, 6 Drawing Sheets

(56) References Cited

U.S. PATENT DOCUMENTS

| | | | |
|---|---|---|---|
| 6,979,249 B2 | 12/2005 | Kramer | |
| 7,267,607 B2* | 9/2007 | Prasad | B24D 3/32 |
| | | | 451/285 |
| 2003/0045106 A1 | 3/2003 | Kramer | |
| 2003/0045210 A1 | 3/2003 | Kramer | |
| 2003/0060137 A1 | 3/2003 | Kramer | |
| 2003/0060151 A1 | 3/2003 | Kramer | |
| 2003/0233792 A1* | 12/2003 | Kramer | B29C 44/3453 |
| | | | 51/300 |
| 2005/0277371 A1 | 12/2005 | Prasad | |
| 2007/0117393 A1* | 5/2007 | Tregub | B24B 37/24 |
| | | | 438/692 |
| 2010/0136372 A1 | 6/2010 | Ishida et al. | |
| 2010/0247868 A1* | 9/2010 | Cha | B24B 37/24 |
| | | | 428/160 |
| 2012/0085038 A1* | 4/2012 | Jeong | B29C 44/348 |
| | | | 51/296 |

OTHER PUBLICATIONS

Korean Intellectual Property Office AS ISA, Written Opinion of the International Searching Authority issued in connection with Application No. PCT/US2014/050997 on Nov. 27, 2014.

The International Bureau of WIPO, International Preliminary Report on Patentability issued in connection with Application No. PCT/US2014/050997 on Feb. 23, 2016.

* cited by examiner

US 9,463,551 B2

POLISHING PAD WITH POROUS INTERFACE AND SOLID CORE, AND RELATED APPARATUS AND METHODS

BACKGROUND OF THE INVENTION

Chemical-mechanical polishing ("CMP") processes are used in the manufacturing of microelectronic devices to form flat surfaces on semiconductor wafers, field emission displays, and many other microelectronic substrates. For example, the manufacture of semiconductor devices generally involves the formation of various process layers, selective removal or patterning of portions of those layers, and deposition of yet additional process layers above the surface of a semiconducting substrate to form a semiconductor wafer. The process layers can include, by way of example, insulation layers, gate oxide layers, conductive layers, and layers of metal or glass, etc. It is generally desirable in certain steps of the wafer process that the uppermost surface of the process layers be planar, i.e., flat, for the deposition of subsequent layers. CMP is used to planarize process layers wherein a deposited material, such as a conductive or insulating material, is polished to planarize the wafer for subsequent process steps.

In a typical CMP process, a wafer is mounted upside down on a carrier in a CMP tool. A force pushes the carrier and the wafer downward toward a polishing pad. The carrier and the wafer are rotated above the rotating polishing pad on the CMP tool's polishing table. A polishing composition (also referred to as a polishing slurry) is introduced between the rotating wafer and the rotating polishing pad during the polishing process. The polishing composition typically contains a chemical that interacts with or dissolves portions of the uppermost wafer layer(s) and an abrasive material that physically removes portions of the layer(s). The wafer and the polishing pad can be rotated in the same direction or in opposite directions, whichever is desirable for the particular polishing process being carried out. The carrier also can oscillate across the polishing pad on the polishing table.

Polishing pads made of harder materials exhibit high removal rates and have long useful pad life, but tend to produce numerous scratches on substrates being polished. Polishing pads made of softer materials exhibit low scratching of substrates, but tend to exhibit lower removal rates and have shorter useful pad life. Accordingly, there remains a need in the art for polishing pads that provide effective removal rates and have extended pad life, and also produce limited scratching.

BRIEF SUMMARY OF THE INVENTION

In one aspect, the invention provides a polishing pad for chemical-mechanical polishing. The polishing pad comprises (a) a substantially non-porous core region, and (b) two opposing surface regions on either side of the core region. At least one of the surface regions defines pores therein to form a porous surface region. The polishing pad is monolithic, and the porous surface region directly contacts the core region without any intermediate layer therebetween. The core region is harder than the porous surface region.

In another aspect, the invention provides a chemical-mechanical polishing apparatus comprising (a) a platen that rotates; (b) a polishing pad disposed on the platen; and (c) a carrier that holds a workpiece to be polished by contacting the rotating polishing pad. The polishing pad comprises (i) a substantially non-porous core region, and (ii) two opposing surface regions on either side of the core region. At least one of the surface regions defines pores therein to form a porous surface region. The polishing pad is monolithic, and the porous surface region directly contacts the core region without any intermediate layer therebetween. The core region is harder than the porous surface region. In some embodiments, the apparatus further comprises (d) means for delivering a chemical-mechanical polishing composition between the polishing pad and the workpiece.

In another aspect, the invention provides a method of polishing a workpiece comprising (i) providing a polishing pad; (ii) contacting the workpiece with the polishing pad; and (iii) moving the polishing pad relative to the workpiece to abrade the workpiece and thereby polish the workpiece. The polishing pad comprises (a) a substantially non-porous core region, and (b) two opposing surface regions on either side of the core region. At least one of the surface regions defines pores therein to form a porous surface region. The polishing pad is monolithic, and the porous surface region directly contacts the core region without any intermediate layer therebetween. The core region is harder than the porous surface region.

In another aspect, the invention provides a method of preparing a polishing pad comprising (a) providing an extruded polymer sheet into a vessel, wherein the polymer sheet is monolithic and has two opposing surfaces; and (b) introducing inert gas into the polymer sheet in the vessel under conditions sufficient to form a porous surface region adjacent to at least one of the surfaces and to form a core region that is substantially non-porous.

BRIEF DESCRIPTION OF THE SEVERAL VIEWS OF THE DRAWING(S)

Figure 5:
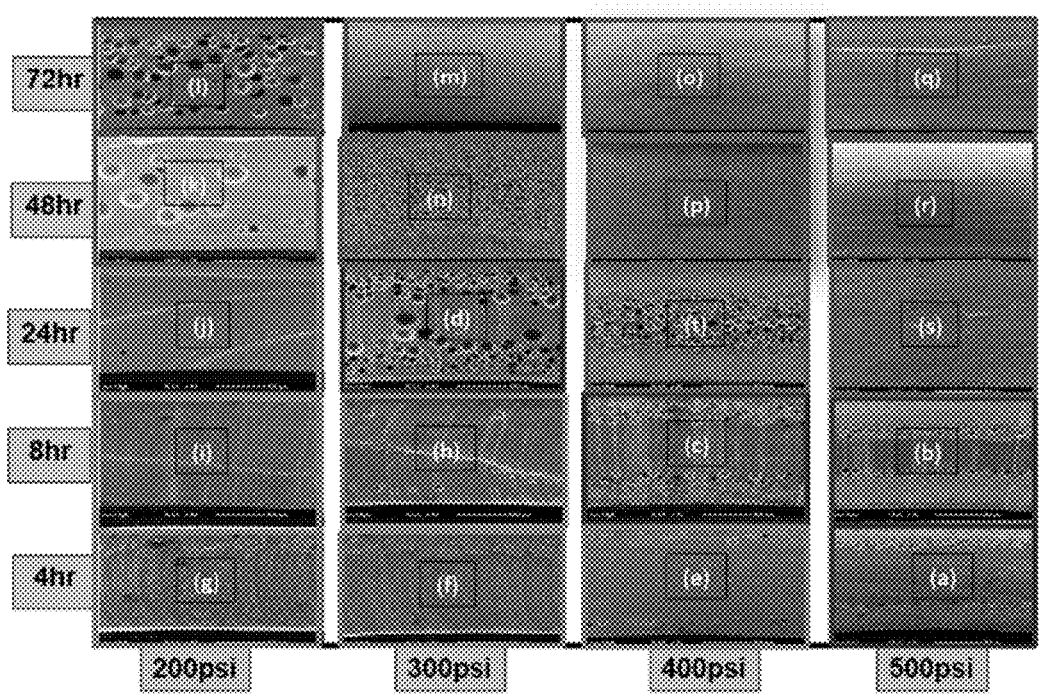

FIG. 5 sets forth a series of SEM micrographs of cross-sections of polishing pads, each at 54 times magnification, wherein the specimens were prepared as described in Example 1.

Figure 6:
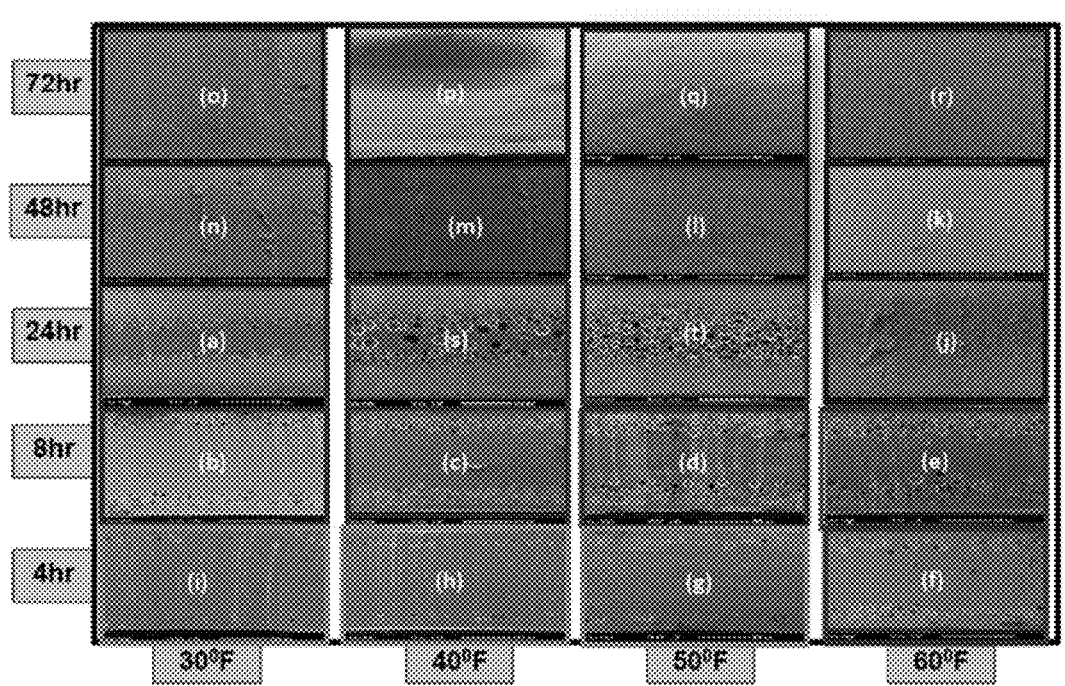

FIG. 6 sets forth a series of SEM micrographs of cross-sections of polishing pads, each at 54 times magnification, wherein the specimens were prepared as described in Example 2.

DETAILED DESCRIPTION OF THE INVENTION

The invention is predicated, at least in part, on the surprising and unexpected discovery of a polishing pad for chemical-mechanical polishing with good planarization efficiency and reduced defectivity (e.g., scratches). The polishing pad is of monolithic structure and has pores (i.e., closed cells) that are concentrated near at least one surface of the pad, while a core of the polishing pad is a solid bulk material that is substantially non-porous, resulting in a desired dual morphology. In accordance with embodiments of the invention, it has been discovered that such a dual morphology structure surprisingly and unexpectedly provides significant advantages in enhancing planarization efficiency while also reducing defectivity when used to polish substrates such as wafers. In other aspects, the invention also provides a related apparatus, as well as methods of preparing and using the polishing pad.

In accordance with embodiments of the invention, a polishing pad is provided of monolithic structure and dual morphology with pores distributed in a manner to achieve compressibility at a surface where polishing occurs while also having a harder, solid, substantially non-porous bulk material in a core underlying the porous surface. The unique and advantageous morphology of the polishing pad of embodiments of the invention is achieved without requiring the use of separate composite or intermediate layers adhered by external components such as by adhesive, e.g., a soft pad adhered to a hard subpad. Furthermore, unlike conventional systems, the polishing pad of the invention does not rely on pores throughout the volume of the polishing pad.

Embodiments of the polishing pad of the invention surprisingly and unexpectedly realize a desired combination of planarization efficiency and low defectivity, both of which are important parameters in CMP processes, and often in conflict with one another in conventional systems. Unlike conventional systems which have porosity throughout the core of the polishing pad and/or use a multi-piece composite system, embodiments of the inventive polishing pad distribute the pores near the surface where the polishing takes place, thereby creating surface compressibility but with a hard, substantially non-porous core. Such a dual morphology results in a reduced number of defects, e.g., scratches, which in turn increases wafer yield during manufacture since less wafers need to be discarded due to concerns over electrical issues such as a loss in continuity in how current would be distributed in use. At the same time, polishing pads in accordance with embodiments of the invention surprisingly can be polished with good planarization efficiency. In this respect, the planarization efficiency is defined as the unitless formula of one minus the ratio of removal rate for the bottom structure divided by the removal rate for the top structure. See, e.g., Y. Li, *Microelectronics Applications of Chemical Mechanical Planarization*, J. Wiley & Sons, 2008, p. 517. By focusing the pores near the surface of the polishing pad to achieve compressibility where contact with the substrate to be polished occurs, while maintaining a rigid bulk core to provide underlying strength in a unitary monolithic structure without intermediate layers, the invention surprisingly and unexpectedly achieves the desired combination of planarization efficiency with low defectivity.

The polishing pad of the invention has applicability in polishing a wide variety of semiconductor wafers used in fabrication of integrated circuits and other microdevices. Such wafers can be of conventional node configuration in some embodiments, e.g., technology nodes of 65 nm or less. 45 nm or less, 32 nm or less, etc. However, in some embodiments, the inventive polishing pad is particularly suited for advanced node applications (e.g., technology nodes of 22 nm or less, 18 nm or less, 16 nm or less, 14 nm or less, etc.). It will be understood that, as node technology becomes more advanced, the absence of defectivity in planarization technology becomes more important because the effects of each scratch have more of an impact as the relative size of features on the wafer gets smaller. Because of the significant advancement over the art that the polishing pad of the invention provides, including the redistribution of pores near the surface of the polishing pad with substantially non-porous core in a monolithic structure, as compared with conventional polishing pads, the level of defectivity is reduced and more advanced node polishing can be achieved with fewer scratches in accordance with embodiments of the invention. As such, embodiments of the polishing pad of the invention can accommodate more precise planarization of wafers with smaller features, with lower absolute removal rate, low defectivity, and good planarization efficiency. However, as noted, the polishing pad of the invention is not limited to use with advanced node wafers and can be used to polish other workpieces as desired.

The polishing pad can comprise, consist essentially of, or consist of any suitable material in which pores are introduced. Desirably, the polishing pad comprises, consists essentially of, or consists of a polymer resin. The polymer resin can be any suitable polymer resin. Typically, the polymer resin is selected from the group consisting of thermosets, thermoplastic elastomers, thermoplastic polyurethanes, polyolefins, polycarbonates, polyvinylalcohols, nylons, elastomeric rubbers, styrenic polymers, polyaromatics, fluoropolymers, polyimides, cross-linked polyurethanes, cross-linked polyolefins, polyethers, polyesters, polyacrylates, elastomeric polyethylenes, polytetrafluoroethylenes, polyethyleneteraphthalates, polyimides, polyamides, polyarylenes, polystyrenes, polymethylmethacrylates, copolymers and block copolymers thereof, and mixtures and blends thereof. Preferably, the polymer resin is a polyurethane, more preferably a thermoplastic polyurethane.

The polymer resin typically is a pre-formed polymer resin; however, the polymer resin also can be formed in situ according to any suitable method, many of which are known in the art (see, for example, Szycher's Handbook of Polyurethanes CRC Press: New York, 1999, Chapter 3). For example, thermoplastic polyurethane can be formed in situ by reaction of urethane prepolymers, such as isocyanate, di-isocyanate, and tri-isocyanate prepolymers, with a prepolymer containing an isocyanate reactive moiety. Suitable isocyanate reactive moieties include amines and polyols.

Prior to introducing the pores, the polymer resin or other material used in forming the polishing pad can have any suitable hardness, e.g., as known in the art. Typically, the hardness of the virgin material is measured by way of an average Shore D hardness as measured according to ASTM D22400-00. Prior to introduction of the pores, the virgin material used in forming the polishing pad can have any suitable hardness according to the Shore D scale, such as, for example, an average Shore D hardness from about 15 to about 72, as measured according to ASTM D22400-00. The average Shore D hardness can be different in different embodiments and can vary, e.g., from about 15 to about 60, from about 15 to about 42, from about 25 to about 72, from about 25 to about 60, from about 25 to about 42, from about 42 to about 72, from about 42 to about 60, etc., all as measured according to ASTM D22400-00. In the final polishing pad, after the pores are introduced, the porous region and the substantially non-porous core region will have different hardnesses in the same pad. For example, in some embodiments, while the substantially non-porous core will have a hardness on the Shore D scale consistent with the virgin material as described above, the porous surface region can have an average Shore A hardness of from about 60 to about 100 as measured according to ASTM D22400-00, e.g., from about 60 to about 90, from about 60 to about 80, from about 60 to about 70, from about 70 to about 90, from about 70 to about 80, etc.

The pores of the polishing pad can have an average pore size of about 1 µm or more, e.g., about 5 µm or more, e.g., about 10 µm or more, about 15 µm or more, about 20 µm or more, about 25 µm or more, about 30 µm or more, about 35 µm or more, about 40 µm or more, about 45 µm or more, about 50 µm or more, about 55 µm or more, about 60 µm or more, about 65 µm or more, about 70 µm or more, about 75 µm or more, about 100 µm or more, about 125 µm or more, or about 150 µm or more. Alternatively, or in addition, the pores of the polishing pad can have an average pore size of about 200 µm or less, e.g., about 190 µm or less, about 180 µm or less, about 175 µm or less, about 170 µm or less, about 160 µm or less, about 150 µm or less, 140 µm or less, 130 µm or less, about 125 µm or less, 120 µm or less, 110 µm or less, 100 µm or less, 90 µm or less, 80 µm or less, 70 µm or less, 60 µm or less, 50 µm or less, 40 µm or less, 30 µm or less, or about 20 µm or less. Thus, the polishing pad can have an average pore size bounded by any two of the endpoints recited for the average pore size. For example, the pores of the polishing pad can have an average pore size of about 1 µm to about 200 µm, 5 µm to about 200 µm, about 5 µm to about 20 µm, about 10 µm to about 100 µm, about 25 µm to about 75 µm, about 50 µm to about 1001 µm, about 75 µm to about 125 µm, about 100 µm to about 150 µm, about 125 µm to about 175 µm, or about 150 µm to about 200 µm.

As used herein, the average pore size refers to the average of the largest diameter of a representative sample of individual pores in the polishing pad. The largest diameter is the same as the Feret diameter. The largest diameter can be obtained from an image of a sample, such as a transmission electron microscope image, either manually or by using image analysis software, e.g., PAX-IT™, commercially available from Midwest Information Systems. Villa Park, Ill. Typically, the sample is obtained by sectioning a portion of a polishing pad.

The polishing pad can have any suitable percentage of void volume (void volume fraction or porosity). In accordance with embodiments of the invention, however, the void volume is distributed in the polishing pad in a manner such that it is concentrated near the surface where the polishing pad contacts the substrate being polished. Meanwhile, the core of the polishing pad is substantially non-porous. As a result, the overall percentage of void volume can be less than in conventional polishing pads. For example, in some embodiments, the percentage of void volume can be an amount less than about 50%, e.g., from about 5% to about 50%, from about 5% to about 40%, from about 5% to about 30%, from about 5% to about 20%, from about 5% to about 15%, from about 10% to about 50%, from about 10% to about 40%, from about 10% to about 30%, from about 10% to about 20%, from about 15% to about 50%, from about 15% to about 40%, from about 15% to about 30%, from about 15% to about 25%, from about 20% to about 50%, from about 20% to about 40%, from about 20% to about 30%, from about 25% to about 50%, from about 25% to about 40%, from about 25% to about 35%, etc. However, in some embodiments, if desired, the percentage of void volume in the polishing pad can be even higher, e.g., above 50%.

As noted, the core of the polishing pad is desirably substantially non-porous. In this respect, in some embodiments, the core has a percentage of void volume of about 2% or less, e.g., about 1% or less, about 0.5% or less, about 0.1% or less, about 0.01% or less, about 0.001% or less, or no void volume.

As compared with conventional polishing pads for chemical-mechanical polishing applications, the voids in embodiments of the inventive polishing pad have a higher nucleation density in porous surface regions of the pad, regardless of the overall percentage of void volume in the pad. In some embodiments of the invention, however, the overall percentage void volume in the pad is lower than found in conventional pads as described herein, but with the percentage of void volume higher in the porous surface region as compared with the corresponding surface region of conventional polishing pads.

The invention also provides a method of preparing a polishing pad for chemical-mechanical polishing. In embodiments of the method, pores are introduced into the polymer resin or other starting material as described herein. To achieve a desired dual morphology in the resulting polishing pad, in accordance with embodiments of the invention, conditions for (a) gassing, and (b) nucleation of bubbles (foaming), are controlled. In particular, conditions relating to pressure, temperature, and residence time thereof are regulated to provide the desired pore structure in polishing pad embodiments of the invention.

In the gassing step, a suitable inert gas is introduced into the starting material, such as a polymer (e.g., an extruded polymer sheet) disposed in a suitable vessel. The vessel is selected to have suitable dimensions, as will be appreciated by one of ordinary skill in the art, to satisfactorily produce the polishing pad of final volume and dimensions including void volume, as desired. The inert gas is selected to have good solubility in the polymer sheet or other starting material. In some embodiments, the inert gas is selected to have the ability to achieve a supersaturated condition in the polymer, e.g., under elevated pressure conditions. For example, in some embodiments, the inert gas is carbon dioxide, nitrogen, helium, argon, or any combination thereof. In some embodiments, a preferred inert gas is carbon dioxide because of its superior solubility property, e.g., in polymers.

To solubilize the inert gas in the polymer sheet in the gassing step, in accordance with embodiments of the inventive method of preparing the polishing pad, an elevated pressure is utilized, typically at moderate temperature. While not wishing to be bound by any particular theory, it is believed that the amount of inert gas dissolved in the polymer is determined by Henry's Law, indicating that, at higher pressure, the inert gas will be dissolved in the polymer, e.g., to create a supersaturated condition in some embodiments. Any suitable elevated gassing pressure can be utilized. In some embodiments, the gassing pressure is from about 1000 kPa to about 3500 kPa, such as, for example, from about 1000 kPa to about 3000 kPa, from about 1000 kPa to about 2500 kPa, from about 1000 kPa to about 2000 kPa, from about 1000 kPa to about 1500 kPa, from about 1500 kPa to about 3500 kPa, from about 1500 kPa to about 3000 kPa, from about 1500 kPa to about 2500 kPa, from about 1500 kPa to about 2000 kPa, from about 2000 kPa to about 3500 kPa, from about 2000 kPa to about 3000 kPa, from about 2000 kPa to about 2500 kPa, from about 2500 kPa to about 3500 kPa, from about 2500 kPa to about 3000 kPa, etc.

The temperature inside the vessel at the elevated pressure during the gassing step can be any moderate temperature, such as, for example, from about 0° C. to about 40° C., e.g., from about 0° C. to about 30° C., from about 0° C. to about 20° C. from about 0° C. to about 10° C., from about 10° C. to about 40° C. from about 10° C. to about 30° C., from about 10° C. to about 20° C., from about 20° C. to about 40° C., from about 20° C. to about 30° C., from about 30° C. to about 40° C., etc.

The gassing step is conducted for a suitable amount of time but is typically limited to about 72 hours or less, e.g., about 48 hours or less, about 24 hours or less, about 8 hours or less, or about 4 hours or less, so that saturation of the inert gas only occurs near one or more surfaces of the polymer sheet (particularly at least the surface region corresponding to the surface that contacts the substrate during polishing) and not throughout the entire core as in conventional polishing pads. In this respect, conducting the gassing step for too long can actually be detrimental because then the core can then become saturated with gas and ultimately undesirably seed nucleation sites for bubbles, which would exist throughout the volume of the polishing pad. While not wishing to be bound by any particular theory, it is believed that the residence time should be relatively low under relatively high pressure during the gassing step, and vice versa.

In accordance with embodiments of the inventive method of preparing a polishing pad, after the gassing step, conditions in the system are adjusted to achieve nucleation of bubbles which appears as foam-like structure in the polishing pad. After the gassing step at elevated pressure, the pressure is reduced, and the temperature is raised to achieve nucleation of the bubbles. By introducing thermodynamic instability into the system, the inert gas, such as carbon dioxide, seeks to separate from the polymer (sometimes referred to herein as "de-gassing") and form nucleation sites that grow to form bubbles in the polishing pad. Over time, the carbon dioxide in the bubbles diffuses out of the polishing pad and is replaced by air through molecular diffusion such that the final product typically contains air voids.

In the pressure reducing step, the pressure in the vessel is reduced to a value of from about 100 kPa to about 0 kPa for a time sufficient to remove the inert gas inside the pressure vessel, yet not for so long a time as to cool the polymer or other starting material excessively or create dry ice conditions (e.g., about 5 minutes or less, such as about 4 minutes or less, about 3 minutes or less, about 2 minutes or less, about 90 seconds or less, about 1 minute or less, about 30 seconds or less, etc.) The transient time between pressure release and foaming is equally important as the inert gas will diffuse out of the polymer or other starting material at ambient conditions. This time is controlled so that it remains less than about one hour, e.g., less than about 30 minutes, such as less than about 10 minutes.

In the heating step, the exposure of the polymer or other starting material to the elevated temperature allows for nucleation and growth of bubbles. Such elevated temperature can be, for example, from about 100° C. to about 175° C., e.g., from about 100° C. to about 150° C., from about 100° C. to about 125° C., from about 125° C. to about 175° C., from about 125° C. to about 150° C., from about 150° C. to about 175° C., etc. The heating can occur in any suitable manner, such as by way of an oven, hot oil bath, or the like. The heating time is sufficient to induce nucleating and bubble growth but is not so long as to cause blistering, melting, or other defects with respect to the polymer or other starting material, e.g., TPU (e.g., about 2 minutes or less, about 90 seconds or less, about 1 minute or less, about 30 seconds or less, etc.).

In some embodiments, the resin is thermoplastic urethane (TPU), and the inert gas is carbon dioxide.

In some embodiments, the method comprises introducing inert gas (e.g., carbon dioxide) into a starting material such as a resin, e.g., in the form an extruded polymer sheet (e.g., TPU), by subjecting the polymer sheet in a suitable vessel to a moderate temperature of from about 0° C. to about 40° C. and a pressure of from about 1000 kPa to about 3500 kPa for about 72 hours or less, to dissolve inert gas in the polymer. Then, the pressure to which the polymer sheet is exposed is decreased to a range from about 100 kPa to about 0 kPa for about 5 minutes or less. Then, the temperature to which the (e.g., supersaturated) polymer/inert gas system is exposed is increased to a range of from about 100° C. to about 175° C., e.g., in an oven, hot oil bath, or the like, for limited time, e.g., typically, two minutes or less, to cause nucleation and growth of bubbles of desired configuration, resulting in voids in the final product in the desired dual morphology as described herein.

The invention further provides a method of polishing a workpiece, e.g., a substrate, comprising (i) contacting the workpiece with the inventive polishing pad, and (ii) moving the polishing pad relative to the workpiece to abrade the workpiece and thereby polish the workpiece. Typically a chemical-mechanical polishing composition will be utilized in the polishing of a workpiece with the inventive polishing pad, such that the inventive method of polishing a workpiece, e.g., a substrate, further comprises providing a chemical-mechanical polishing composition between the polishing pad and the workpiece, contacting the workpiece with the polishing pad with the polishing composition therebetween, and moving the polishing pad relative to the workpiece with the polishing composition therebetween to abrade the workpiece and thereby polish the workpiece.

The polishing pad of the invention is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad of the invention in contact with the platen and moving with the platen when in motion, and a carrier that holds a substrate to be polished by contacting and moving relative to the surface of the polishing pad intended to contact a substrate to be polished. The polishing of the substrate takes place by the substrate being placed in contact with the polishing pad and then the polishing pad moving relative to the substrate, typically with a polishing composition therebetween, so as to abrade at least a portion of the substrate to polish the substrate. The CMP apparatus can be any suitable CMP apparatus, many of which are known in the art. The polishing pad of the invention also can be used with linear polishing tools.

In another aspect, the invention provides a chemical-mechanical polishing apparatus comprising (a) a platen that rotates; (b) a polishing pad in accordance with embodiments described herein and disposed on the platen; and (c) a carrier that holds a workpiece to be polished by contacting the rotating polishing pad. In some embodiments, the apparatus further comprises (d) means for delivering a chemical-mechanical polishing composition between the polishing pad and the workpiece. For example, in some embodiments, the means for delivering the chemical-mechanical polishing composition can include, for example, a pump and flow metering system.

The polishing pad described herein is suitable for use in polishing any suitable substrate, e.g., memory storage devices, semiconductor substrates, and glass substrates. Suitable substrates for polishing with the polishing pad include memory disks, rigid disks, magnetic heads, MEMS devices, semiconductor wafers, field emission displays, and other microelectronic substrates, especially substrates comprising insulating layers (e.g., silicon dioxide, silicon nitride, or low dielectric materials) and/or metal-containing layers (e.g., copper, tantalum, tungsten, aluminum, nickel, titanium, platinum, ruthenium, rhodium, iridium, or other noble metals).

Figure 1:
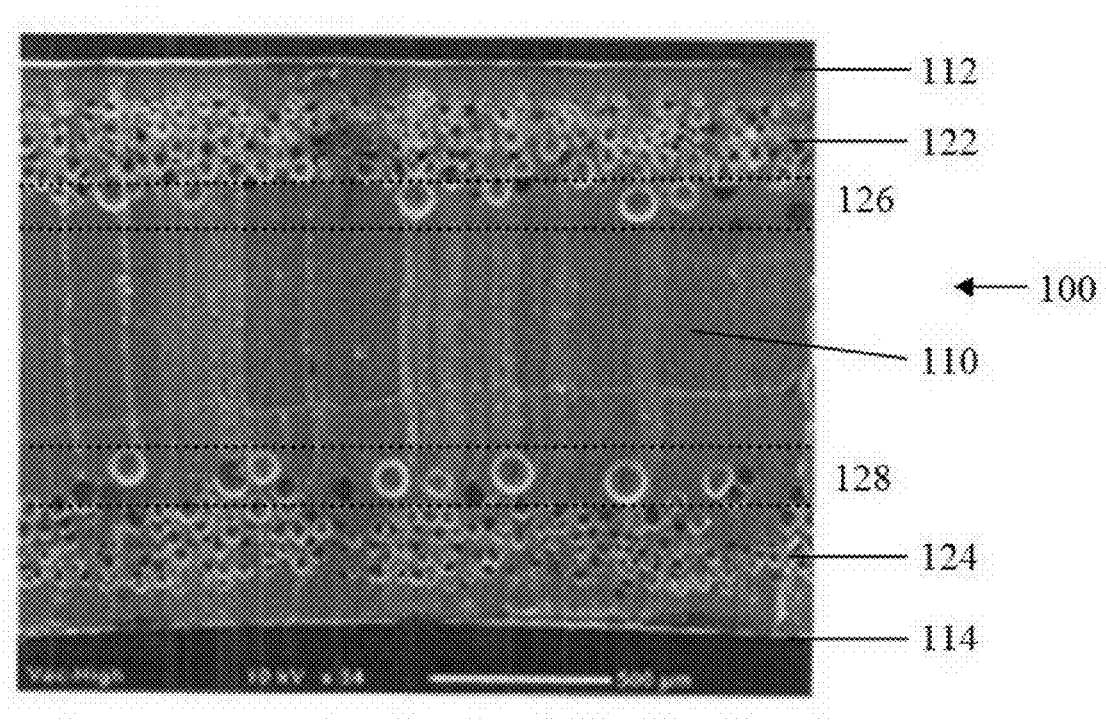
FIG. 1 is a scanning electron micrograph (SEM) of a cross-section of a polishing pad at 54 times magnification, illustrating pores at two surface regions with a substantially non-porous core, in accordance with an embodiment of the invention.
Figure 2:
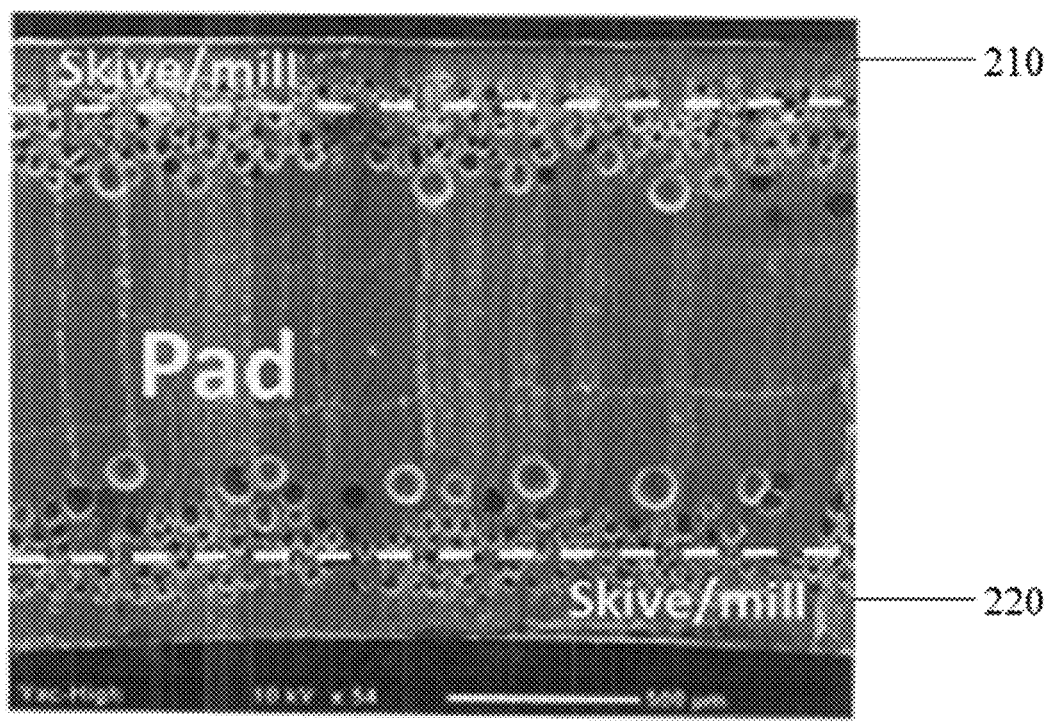
FIG. 2 is the same SEM as set forth in FIG. 1 but further illustrating a skin layer to be removed, in accordance with an embodiment of the invention.
Figure 3:
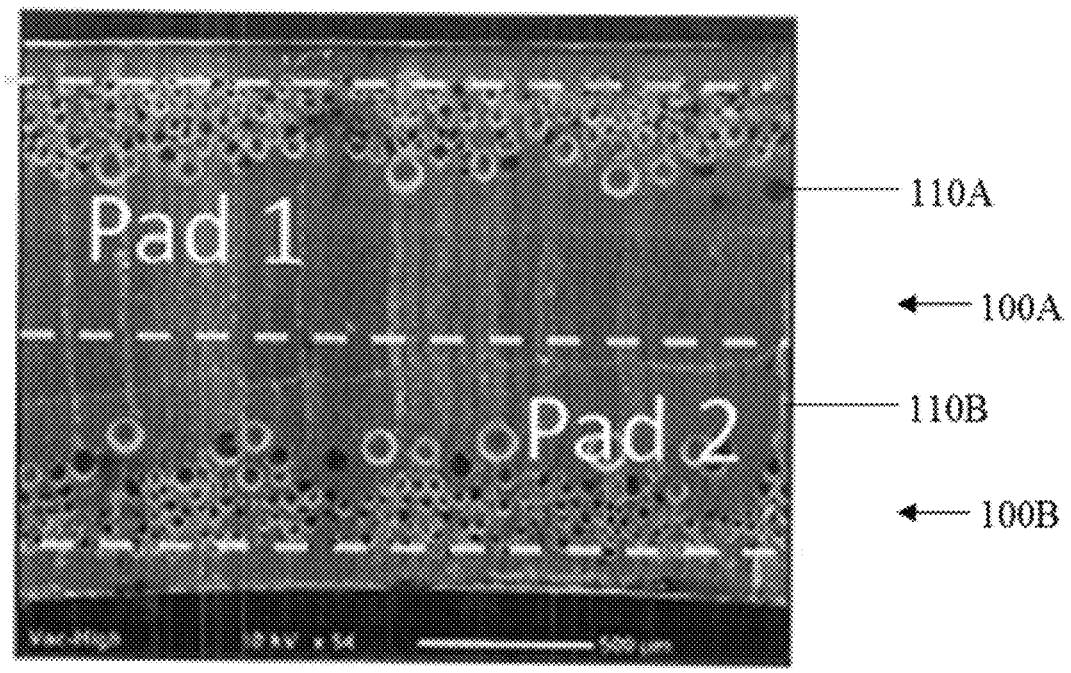
FIG. 3 is the same SEM as set forth in FIG. 1 but further illustrating skiving the product into two polishing pads, with each pad having pores at only one surface region and each having a substantially non-porous core, in accordance with an embodiment of the invention.

Referring to the figures, FIGS. 1-3 illustrate various embodiments of the invention through the use of the same scanning electron photomicrograph (SEM), at 54 times magnification, of a cross-section of a polishing pad useful for chemical-mechanical polishing. As seen in FIG. 1, the polishing pad 100 has a substantially non-porous core 110 and two opposing surfaces 112 and 114. In some embodiments, the opposing surfaces are substantially parallel. Substantially parallel opposing surfaces in some embodiments are where the two surfaces have a horizontal axis and the maximum deviation between the axes at corresponding points is, e.g., about 30 degrees or less, such as about 25 degrees or less, 20 degrees or less, 15 degrees or less, 10 degrees or less, 5 degrees or less, 1 degree or less, or no deviation.

As shown in FIG. 1, unlike conventional polishing pads, the core 110 is substantially non-porous, and the polishing pad 100 is formed of monolithic, unitary material without requiring multiple separate composite layers attached, for example, with intermediate layers or adhesive. A first porous surface region 122 is adjacent the first surface 112, and a second porous surface region 124 is adjacent the second surface 114. Each porous surface region 122 and 124 comprises a transition zone 126 and 128, respectively, in which the pores contact the core 110. The pores in the transition zones 126 and 128 have an average pore diameter greater than the average pore diameter of the pores in the porous surface regions 122 and 124 outside the transition zones. In some embodiments, the pores get progressively larger closer to the core 110 as compared with the outermost surface of the pad 112 or 114. However, it will be appreciated that, in alternative embodiments, any porous surface region can be oriented such that pores in the transition zone have an average pore diameter less than the average pore diameter of the pores in the surface region outside the transition zone. In some embodiments, the pores are progressively smaller closer to the core 110 as compared with the outermost surface of the pad 112 or 114.

The core region 110 can have any suitable thickness, which is generally defined in a direction substantially perpendicular to the two opposing surfaces. The thickness of the core region 110 desirably is sufficient to impart sufficient rigidity and strength underlying the porous surface region that contacts the substrate being polished. In some embodiments, the core region 110 has a thickness of from about 0.5 mm ($\approx$20 mil) to about 3 mm ($\approx$120 mil).

Each porous surface region can have any suitable thickness in a direction substantially perpendicular to the two opposing surfaces. Desirably, a porous surface region has a thickness of from about 0.05 mm (e.g., one monolayer of $\approx$50 micron pores) to about 1.5 mm ($\approx$60 mil).

The ratio of thickness of a porous region relative to the non-porous region can be any suitable value so long as the desired results of planarization efficiency and low defectivity are realized for the polishing pad. For example, in some embodiments, the ratio of thickness of a porous region relative to the non-porous region is from about 0.2:1 to about 2:1, from about 0.2:1 to about 1.75:1, from about 0.2:1 to about 1.5:1, from about 0.2:1 to about 1.25:1, from about 0.2:1 to about 1.15:1, from about 0.2:1 to about 1:1, from about 0.2:1 to about 0.75:1, from about 0.2:1 to about 0.5:1, from about 0.5:1 to about 2:1, from about 0.5:1 to about 1.75:1, from about 0.5:1 to about 1.5:1 from about 0.5:1 to about 1.25:1, from about 0.5:1 to about 1.15:1, from about 0.5:1 to about 1:1, from about 0.5:1 to about 0.75:1, from about 0.75:1 to about 2:1, from about 0.75:1 to about 1.75:1, from about 0.75:1 to about 1.5:1, from about 0.75:1 to about 1.25:1, from about 0.75:1 to about 1.15:1, from about 0.75:1 to about 1:1, from about 1:1 to about 2:1, from about 1:1 to about 1.75:1, from about 1:1 to about 1.5:1, from about 1:1 to about 1.25:1, from about 1:1 to about 1.15:1, from about 1.15:1 to about 2:1, from about 1.15:1 to about 1.75:1, from about 1.15:1 to about 1.5:1, etc.

The overall dimensions of the polishing pad can be configured to be suitable for end use applications, e.g., to correspond with desired platens, etc., as will be appreciated by one of ordinary skill in the art. For example, in some embodiments, the thickness of the polishing pad can be at least about 0.75 mm ($\approx$30 mil), such as at least about 1.25 mm ($\approx$50 mil). In embodiments where two polishing pads are formed in one batch with skiving as depicted in FIG. 3, the thickness of each polishing pad can be somewhat less (e.g., half of these thicknesses) in some embodiments, or the batches can be made in larger vessels to allow for making two polishing pads of the aforementioned thickness.

FIG. 2 is the same SEM as in FIG. 1 but depicts the optional removal of one or both skin layers 210 and 220 on either side of the pad 100. The skin layers 210 and 220 are non-porous and are formed as an outer layer on the polymer sheet adjacent to the surface region opposite the core region. The skin layers 210 and 220 can be removed in any suitable manner to expose the surface region suitable for contact with a workpiece such as a substrate (e.g., wafer). For example, the skin layer can be removed by buffing, skiving, and/or milling (e.g., using rotating blades), or the like. Such removal of the skin layers 210 and 220 can further enhance compressibility of the pad 100 at the surface where contact with the substrate to be polished occurs.

FIG. 3 is the same SEM as in FIG. 1 but depicts the formation of two separate pads 100A and 100B. The two pads 100A and 100B can be formed from the same process depicted in FIGS. 1-2, with an added step of slicing the core substantially horizontally so that each pad 100A and 100B has its own core 110A and 110B, respectively. Each pad 100A and 100B has only one porous surface region (whereas each of the embodiments set forth in FIGS. 1 and 2 has two opposing porous surface regions). The core can be sliced in any suitable manner, with skiving being a particularly suitable method. The formation of two pads 100A and 100B as depicted in FIG. 3 is useful in enhancing efficiency in production.

Figure 4:
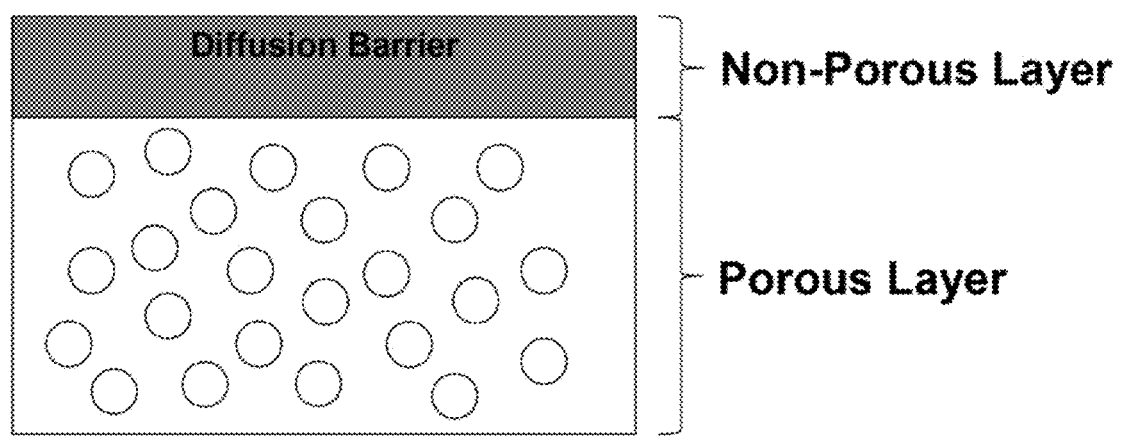
FIG. 4 is a schematic illustration of a polishing pad comprising a porous thermoplastic layer and a diffusion barrier.

In another alternative embodiment, as shown in FIG. 4, a single porous surface region can be formed by use of an optional diffusion barrier. If included, the optional diffusion barrier can be a secondary layer which is welded, laminated, or co-extruded on the monolithic starting material, i.e., the primary polymer (e.g., TPU). This diffusion barrier layer has much lower solubility and permeability for inert gas. e.g., carbon dioxide, compared to the primary monolithic polymer such as TPU. The inert gas such as carbon dioxide is absorbed only by the primary monolithic polymer which is the core of the polishing pad structure while the secondary layer of the polishing pad is non-porous and serves as a diffusion barrier in this embodiment. The thickness ratio of the porous layer to the non-porous layer can be adjusted by the initial thicknesses of the primary polymer layer and the secondary layer. Typical materials that can be used as diffusion barriers include polymers with high degrees of crystallinity (e.g., >60%) such as high density polyethylene, polyvinylidine chloride (PVD) and polyvinylidine fluoride (PVF).

As noted with respect to FIGS. 1-3, depending on application, in various embodiments of the invention, the polishing pad can have two opposing porous surface regions (as shown in FIGS. 1-2) or one porous surface region (as shown in FIG. 3). When the polishing pad is attached to a platen, only one porous surface region is in contact with the substrate being polished such that, in some embodiments, having an opposite porous surface region is not needed, such that two polishing pads can be made (e.g., via skiving) as shown in FIG. 3 from one batch for efficiency purposes. However, in other embodiments, it may be desirable to have a porous surface region opposite to the porous surface region that is applied to the substrate being polished. For example, during use, an adhesive typically is used to attach the polishing pad to the platen of a polishing apparatus, and the existence of a porous surface region on the side of the polishing pad that is adhered to the platen can enhance the adhesion of the polishing pad to the platen.

In embodiments of the invention, grooving patterns can be configured into the surface of the pad that will contact a substrate to be polished to facilitate polishing composition (slurry) distribution during the polishing process. Normally, the incorporation of grooves occurs in a later stage in the process, e.g., after optional skiving of skin layers and/or skiving of a pad into two pads as described above.

The following examples further illustrate the invention but, of course, should not be construed as in any way limiting its scope.

Example 1

This example illustrates the preparation of inventive polishing pads (polishing pads 1A-1D) and comparative polishing pads (polishing pads 1E-1T). The scanning electron micrographs (SEMs) depicted by the lettering (a)-(t) in FIG. 5 correspond to polishing pads 1A-1T, respectively, in this example. All of the polishing pads were prepared from an extruded thermoplastic polyurethane (TPU) having a hardness of 60D on the Shore D hardness scale as measured according to ASTM D22400-00. The description below relative to inventive polishing pads 1A-1D illustrates process conditions that favor the formation of solid core-porous interface dual morphology using gassing temperature and saturation time as control variables in accordance with embodiments of the invention. In contrast, the description relative to comparative polishing pads 1E-1J illustrate conditions that do not favor the formation of solid core-porous interface morphology, and the description relative to comparative polishing pads 1K-1T illustrate conditions resulting in the formation of bubbles throughout the cross-section of the TPU film. Each polishing pad was prepared in the same manner as polishing pad 1A unless otherwise stated.

Polishing Pad 1A

A specimen of extruded TPU was introduced into a laboratory pressure vessel and allowed to absorb carbon dioxide gas for 4 hours at 500 psig (3.45 MPa). The pressure of the vessel was monitored and controlled automatically within ±5 psig (0.03 MPa) of target using a pressure controller. The temperature of the specimen during gas absorption was maintained at 10° C. This was accomplished by circulating cooling fluid in the external jacket surrounding the pressure vessel and controlling the temperature using a temperature controller within less than 0.3° C. from target. After carbon dioxide saturation, the specimen was left to de-gas for 20 minutes before foaming in an oil bath at 154.4° C. for 2 minutes. The morphology of the foamed specimen is shown in SEM (a) of FIG. 5. The porosity of the foamed specimen was 12.5%, and the average pore size was 17 µm. The ratio of porous to non-porous layer thickness was 0.52:1.

Polishing Pad 1B

A specimen of extruded TPU was introduced into a laboratory pressure vessel and allowed to absorb carbon dioxide gas for 8 hours at 500 psig (3.45 MPa). The temperature of the specimen during gas absorption was maintained at 10° C. After carbon dioxide saturation, the specimen was left to de-gas for 20 minutes before foaming in an oil bath at 154.4° C. for 2 minutes. The morphology of the foamed specimen is shown in SEM (b) of FIG. 5. The porosity of the foamed specimen was 28%, and the average pore size was 18 µm. The ratio of porous to non-porous layer thickness was 1.15:1.

Polishing Pad 1C

A specimen of extruded TPU was introduced into a laboratory pressure vessel and allowed to absorb carbon dioxide gas for 8 hours at 400 psig (2.76 MPa). The temperature of the specimen during gas absorption was maintained at 10° C. After carbon dioxide saturation, the specimen was left to de-gas for 20 minutes before foaming in an oil bath at 154.4° C. for 2 minutes. The morphology of the foamed specimen is shown in SEM (c) of FIG. 5. The porosity of the foamed specimen was 14%, and the average pore size was 35 µm. The ratio of porous to non-porous layer thickness was 0.22:1.

Polishing Pad 1D

A specimen of extruded TPU was introduced into a laboratory pressure vessel and allowed to absorb carbon dioxide gas for 24 hours at 300 psig (2.07 MPa). The temperature of the specimen during gas absorption was maintained at 10° C. After carbon dioxide saturation, the specimen was left to de-gas for 20 minutes before foaming in an oil bath at 154.4° C. for 2 minutes. The morphology of the foamed specimen is shown in SEM (d) of FIG. 5. The porosity of the foamed specimen was 27%, and the average pore size was 91 µm. The ratio of porous to non-porous layer thickness was 1.14:1.

Polishing Pads 1E, 1F, 1G, 1H, 1I, and 1J

Specimens of extruded TPU were introduced into a laboratory pressure vessel and allowed to absorb carbon dioxide under the conditions shown for SEMs (e)-(j), respectively, in FIG. 5. The temperature of the specimens during gas absorption was maintained at 10° C. After carbon dioxide saturation, the specimens were left to de-gas for 20 minutes before foaming in an oil bath at 154.4° C. for 2 minutes. Under these conditions, the amount of carbon dioxide absorbed by each of the specimens was not sufficient to create bubbles upon foaming.

Polishing Pads 1K, 1L, 1M, 1N, 1O, 1P, 1Q, 1R, 1S, and 1T

Specimens of extruded TPU were introduced into a laboratory pressure vessel and allowed to absorb carbon dioxide under the conditions shown for SEMs (k)-(t), respectively, in FIG. 5. The temperature of the specimens during gas absorption was maintained at 10° C. After carbon dioxide saturation, the specimens were left to de-gas for 20 minutes before foaming in an oil bath at 154.4° C. for 2 minutes. The carbon dioxide gas concentration of each of these specimens was above 2 wt. % and was sufficient to cause nucleation and bubble formation in the entire cross-section of the TPU film as seen in SEMs (k)-(t) of FIG. 5. This is the cross-section morphology of a polishing pad that is obtained by solid state foaming of TPU in a conventional manner.

The results of this example demonstrate that there is a relatively narrow range of carbon dioxide concentration in the polymer that enables the formation of a suitable solid core-porous interphase morphology. The optimum carbon dioxide concentration range is dependent on a variety of factors, including the temperature at which the polymer is foamed and the de-gassing time that elapses between removing the polymer the increased pressure environment and foaming the polymer. With TPU under the conditions set forth in this example, the carbon dioxide concentration in the polymer that enables the formation of a suitable solid core-porous interphase morphology is 1-2%. A carbon dioxide concentration below 1 wt. % is not sufficient to cause nucleation and bubble formation in the polymer upon foaming, while a carbon dioxide concentration above 2 wt. % causes nucleation and bubble formation throughout the entire polymer upon foaming.

Example 2

This example illustrates the preparation of inventive polishing pads (polishing pads 2A-2F) and comparative polishing pads (polishing pads 2G-2T). The scanning electron micrographs (SEMs) depicted by the lettering (a)-(t) in FIG. 6 correspond to polishing pads 2A-2T, respectively, in this example. All of the polishing pads were prepared from an extruded thermoplastic polyurethane (TPU) having a hardness of 60D on the Shore D hardness scale, as measured according to ASTM D22400-00. The description below relative to inventive polishing pads 2A-2F illustrates process conditions that favor the formation of a solid core-porous interface dual morphology using gassing temperature and saturation time as control variables in accordance with embodiments of the invention. In contrast, the description relative to comparative polishing pads 2G-2I illustrates conditions that do not favor the formation of a solid core-porous interface morphology, and the description relative to comparative polishing pads 2J-2T illustrates conditions resulting in the formation of bubbles throughout the cross-section of the TPU film.

Polishing Pad 2A

A specimen of extruded TPU was introduced into a laboratory pressure vessel and allowed to absorb carbon dioxide gas for 24 hours at 2.76 MPa. The temperature of the specimen during gas absorption was maintained at −1.1° C. After carbon dioxide saturation, the specimen was left to de-gas for 20 minutes before foaming in an oil bath at 154.4° C. for 2 minutes. The morphology of the foamed specimen is shown in SEM (a) of FIG. 6. The porosity of the foamed specimen was 22%, and the average pore size was 35 µm. The ratio of porous to non-porous layer thickness was 1.7:1.

Polishing Pad 2B

A specimen of extruded TPU was introduced into a laboratory pressure vessel and allowed to absorb carbon dioxide gas for 8 hours at 2.76 MPa. The temperature of the specimen during gas absorption was maintained at −1.1° C. After carbon dioxide saturation, the specimen was left to de-gas for 20 minutes before foaming in an oil bath at 154.4° C. for 2 minutes. The morphology of the foamed specimen is shown in SEM (b) of FIG. 6. The porosity of the foamed specimen was 7%, and the average pore size was 26 µm. The ratio of porous to nonporous layer thickness was 0.3:1.

Polishing Pad 2C

A specimen of extruded TPU was introduced into a laboratory pressure vessel and allowed to absorb carbon dioxide gas for 8 hours at 2.76 MPa. The temperature of the specimen during gas absorption was maintained at 4.4° C. After carbon dioxide saturation, the specimen was left to de-gas for 20 minutes before foaming in an oil bath at 154.4° C. for 2 minutes. The morphology of the foamed specimen is shown in SEM (c) of FIG. 6. The porosity of the foamed specimen was 11%, and the average pore size was 30 µm. The ratio of porous to nonporous layer thickness was 0.5:1.

Polishing Pad 2D

A specimen of extruded TPU was introduced into a laboratory pressure vessel and allowed to absorb carbon dioxide gas for 8 hours at 2.76 MPa. The temperature of the specimen during gas absorption was maintained at 10° C. After carbon dioxide saturation, the specimen was left to de-gas for 20 minutes before foaming in an oil bath at 154.4° C. for 2 minutes. The morphology of the foamed specimen is shown in SEM (d) of FIG. 6. The porosity of the foamed specimen was 14%, and the average pore size was 35 µm. The ratio of porous to nonporous layer thickness was 0.22:1. The preparation and results of this polishing pad were identical to polishing pad 1C described above.

Polishing Pad 2E

A specimen of extruded TPU was introduced into a laboratory pressure vessel and allowed to absorb carbon dioxide gas for 8 hours at 2.76 MPa. The temperature of the specimen during gas absorption was maintained at 15.5° C. After carbon dioxide saturation, the specimen was left to de-gas for 20 minutes before foaming in an oil bath at 154.4° C. for 2 minutes. The morphology of the foamed specimen is shown in SEM (e) of FIG. 6. The porosity of the foamed specimen was 19%, and the average pore size was 64 µm. The ratio of porous to non-porous layer thickness was 1.17:1.

Polishing Pad 2F

A specimen of extruded TPU was introduced into a laboratory pressure vessel and allowed to absorb carbon dioxide gas for 4 hours at 2.76 MPa. The temperature of the specimen during gas absorption was maintained at 15.5° C. After carbon dioxide saturation, the specimen was left to de-gas for 20 minutes before foaming in an oil bath at 154.4° C. for 2 minutes. The morphology of the foamed specimen is shown in SEM (f) of FIG. 6. The porosity of the foamed specimen was 7.5%, and the average pore size was 52 µm. The ratio of porous to non-porous layer thickness was 0.67:1.

Polishing Pads 2G, 2H, and 2I

Specimens of extruded TPU were introduced into a laboratory pressure vessel and allowed to absorb carbon dioxide under the conditions indicated for SEMs (e)-(j), respectively, in FIG. 6. The pressure in the vessel was maintained at 2.76 MPa for each of the specimens. After carbon dioxide saturation, the specimens were left to de-gas for 20 minutes before foaming in an oil bath at 154.4° C. for 2 minutes. The morphologies of the foamed specimens are shown in SEMs (g)-(i), respectively, in FIG. 6. Under these conditions, the amount of carbon dioxide gas absorbed in the TPU was not sufficient to create bubbles upon foaming. In some cases, only a monolayer of bubbles was formed close to the surface.

Polishing Pads 2J, 2K, 2L, 2M, 2N, 2O, 2P, 2Q, and 2R

The preparation of these polishing pads, performed under the conditions indicated for SEMs (j)-(r), respectively, in FIG. 6 illustrate conditions that result in bubble formation throughout the entire cross-section of the TPU film. Such an effect is achieved when both sufficiently high concentration of carbon dioxide and a sufficiently long saturation time are provided so that the diffusion rate limitations that enable the dual morphology described for polishing pads 2A-2F are not present.

Polishing Pads 2S and 2T

The preparation of these polishing pads, under the conditions indicated for SEMs (s) and (t), respectively, in FIG. 6 illustrate conditions that result in a dual pore size distribution across the cross-section of the polishing pad with larger pores in the core and smaller pores at the surface. Such an effect is achieved by controlling the amount of carbon dioxide concentration in the TPU and the diffusion rates of carbon dioxide into and out of the TPU during the gassing and de-gassing process steps, respectively.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing a polishing pad comprising:
   (a) providing a polymer sheet into a vessel, wherein the polymer sheet is monolithic and has two opposing surfaces; and
   (b) introducing inert gas into the polymer sheet in the vessel under conditions sufficient to form a porous surface region adjacent to at least one of the surfaces and to form a core region that is substantially non-porous, wherein the surface region is formed on each side of the core region such that a first surface region forms at least part of one of the two opposing parallel surfaces of the polishing pad and a second surface region forms at least part of the other of the two opposing parallel surfaces of the polishing pad, and wherein the method further comprises cutting the core substantially along a horizontal axis to form two polishing pads.

2. The method of claim 1, wherein the inert gas comprises carbon dioxide.

3. The method of claim 1, wherein an outer skin layer is formed on the polymer sheet adjacent to the surface region opposite the core region, and wherein the method further comprises removing the skin layer to expose the surface region suitably for contact with a workpiece.

4. The method of claim 1, wherein the skin layer is removed by buffing, skiving, and/or milling.

5. The method of claim 1, wherein the porous surface region is formed adjacent to both opposing surfaces.

6. The method of claim 1, wherein the porous surface region is formed adjacent to only one of the opposing surfaces.

7. The method of claim 1, wherein the inert gas is introduced while the polymer is subjected to a temperature of from about 0° C. to about 40° C. for about 72 hours or less.

8. The method of claim 1, wherein the inert gas is introduced while the contents of the vessel are subjected to pressure of from about 1000 kPa to about 3500 kPa for about 72 hours or less.

9. The method of claim 8, further comprising reducing the pressure in the vessel to a value from about 100 kPa to about 0 kPa for about 5 minutes or less, and increasing the temperature in the vessel to a value from about 100° C. to about 175° C. for about 2 minutes or less.

10. The method of claim 1, wherein the introduction of inert gas comprises:
    subjecting the polymer sheet in the vessel to a temperature of from about 0° C. to about 40° C. and a pressure of from about 1000 kPa to about 3500 kPa for about 72 hours or less, to dissolve inert gas in the polymer; then decreasing the pressure to which the polymer sheet is exposed to from about 100 kPa to about 0 kPa for about 5 minutes or less; and then increasing the temperature to which the polymer sheet is exposed to from about 100° C. to about 175° C.

11. The method of claim 1, further comprising providing grooves onto an exterior surface of the pad.

* * * * *